United States Patent
Magana et al.

(10) Patent No.: US 10,270,267 B2
(45) Date of Patent: Apr. 23, 2019

(54) CHARGING DEVICE FOR SUPPORTING A COMPUTING DEVICE AT MULTIPLE POSITIONS

(75) Inventors: Giovanni Mata Magana, Sunnyvale, CA (US); Michael Christian Ryner, Brentwood, CA (US); Richard Gioscia, Santa Clara, CA (US); Philip Bryan, Menlo Park, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 662 days.

(21) Appl. No.: 14/394,496

(22) PCT Filed: Jul. 30, 2012

(86) PCT No.: PCT/US2012/048908
§ 371 (c)(1),
(2), (4) Date: Oct. 15, 2014

(87) PCT Pub. No.: WO2014/021828
PCT Pub. Date: Feb. 6, 2014

(65) Prior Publication Data
US 2015/0077041 A1 Mar. 19, 2015

(51) Int. Cl.
*H02J 7/00* (2006.01)
(52) U.S. Cl.
CPC ......... *H02J 7/0042* (2013.01); *H02J 7/0044* (2013.01); *H02J 7/0052* (2013.01)
(58) Field of Classification Search
CPC ...... H02J 7/0042; H02J 7/0052; H02J 7/0045; H01R 13/22; H01R 25/147; H01R 9/095; H01R 12/57; H01R 23/72

USPC .......... 320/107; 439/884; 174/268; 307/145
See application file for complete search history.

(56) References Cited

U.S. PATENT DOCUMENTS

| 6,483,698 | B1 * | 11/2002 | Loh ....................... G06F 1/1632 320/113 |
| 7,013,163 | B2 | 3/2006 | Jaggers et al. |
| 7,982,436 | B2 * | 7/2011 | Randall ................. G06F 1/1626 320/113 |
| 8,078,787 | B2 | 12/2011 | Lydon et al. |
| 8,169,185 | B2 | 5/2012 | Partovi et al. |
| 2009/0236140 | A1 * | 9/2009 | Randall ................. H01R 13/03 174/268 |
| 2009/0278495 | A1 | 11/2009 | Kaye et al. |
| 2010/0093195 | A1 * | 4/2010 | Trout .................. H01R 13/113 439/75 |

(Continued)

FOREIGN PATENT DOCUMENTS

KR 20080003435 U 8/2008

OTHER PUBLICATIONS

"Hands-on with the Samsung Galaxy Nexus Pogo Dock"; http://www.droid-life.com/2012/02/27/hands-on-with-the-samsung-galaxy-nexus-pogo-dock/; retrieved on May 30, 2012.

(Continued)

*Primary Examiner* — Drew A Dunn
*Assistant Examiner* — Harry O'Neill-Becerril
(74) *Attorney, Agent, or Firm* — Mahamedi Paradice LLP (57) ABSTRACT

A charging device is provided. The charging device includes a support structure and contact elements provided in the support structure. The contact elements are positioned to mate or make electrical contact with a set of contact elements of a computing device.

17 Claims, 4 Drawing Sheets

(56) References Cited

U.S. PATENT DOCUMENTS

| | | |
|---|---|---|
| 2010/0137038 A1 | 6/2010 | Scholz et al. |
| 2010/0156197 A1 | 6/2010 | Randall |
| 2011/0098087 A1 | 4/2011 | Tseng |
| 2011/0261509 A1 | 10/2011 | Xu et al. |

OTHER PUBLICATIONS

International Search Report and Written Opinion received in related PCT Application No. PCT/US2012/048908, dated Mar. 28, 2013, 10 pages.

* cited by examiner

CHARGING DEVICE FOR SUPPORTING A COMPUTING DEVICE AT MULTIPLE POSITIONS

BACKGROUND OF THE INVENTION

Computing devices are typically recharged using a power cord or a charging device. A charging device, such as a charging dock or station, can include electrical contacts or a physical port to mate with corresponding contacts or a corresponding port of the computing device.

DETAILED DESCRIPTION

Embodiments described herein include a charging device that can provide power to a computing device despite a misplacement of a computing device on the charging device. Still further, the position of the contact elements of the charging device allow for a tolerance misplacement of the computing device when the computing device is received at any point along a distance of the base of a support structure.

According to embodiments, the charging device includes a support structure that is dimensioned to receive a computing device along a distance of the base of the support structure. The charging device also includes multiple contact elements that are provided in the support structure to mate or make contact with a corresponding set of contact elements of the computing device. The multiple contact elements are positioned to make electrical contact with the corresponding set of contact elements when the computing device is received at any point along the distance of the base of the support structure.

In an embodiment, the charging device can include a power circuit to provide a power signal using at least one of the multiple contact elements. For example, a power signal provided by the charging device can include a voltage and/or frequency, and can be used to charge a power source of a computing device. The charging device can also include a detect circuit to detect a presence of the computing device using at least another one of the multiple contact elements.

Still further, the charging device can include three contact elements that are aligned with each other in the support structure. Depending on embodiments, the three contact elements can be positioned so that the distance between the first contact element and the second contact element and the distance between the second contact element and the third contact element are substantially equal in size. In other embodiments, the distances between the respective contact elements can be different in size.

As described herein, a computing device that can be recharged by the charging device can include a laptop computer, a tablet device, a smart phone, a keyboard, or a trackpad. As used herein, the term "substantially" means at least 90% of a stated reference, value or point of comparison. In the context of "substantially aligned," for example, two objects that are substantially aligned may be positioned so as to be aligned within 90% of each other.

Figure 1A:
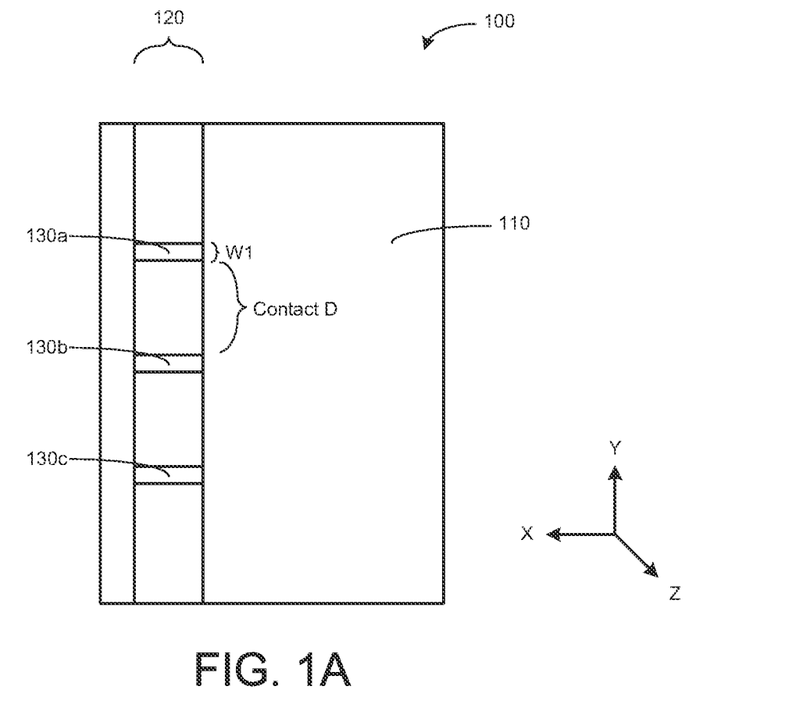
FIGS. 1A-1B illustrate an example charging device for a computing device.
Figure 1B:
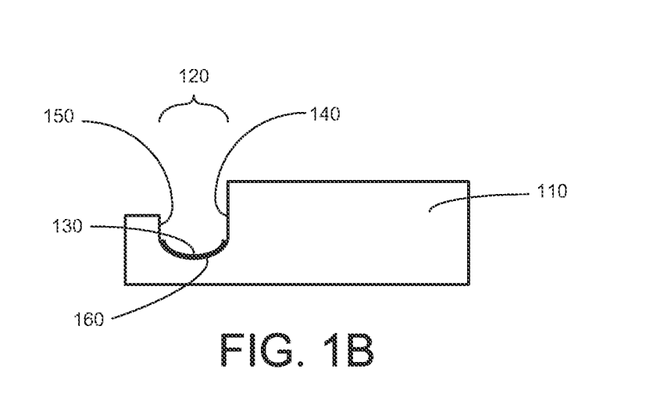

FIGS. 1A-1B illustrate an example charging device for a computing device. FIG. 1A illustrates a top view of a high-speed charging device 100 (e.g., looking down in the Z-direction), while FIG. 1B illustrates a side view of the charging device 100. The charging device 100, such as a charging dock or charging station, can include a main body 110, a support structure 120, and multiple contact elements 130 (e.g., a first contact element 130a, a second contact element 130b, and a third contact element 130c). Depending on different variations, the charging device 100 can also include more or less contact elements (e.g., two or four, or more than four). Each of the multiple contact elements 130a, 130b, 130c can be provided in the support structure 120.

In some examples, the support structure 120 can be a recessed region of the main body 110. In other examples, the support structure 120 can be a separate structure that is coupled to or provided on the main body 110. The support structure 120 can be dimensioned to receive a computing device along the base 160. For example, the support structure 120 can have a first wall 140 having a first height, a second wall 150 having a second height, and a base 160. The support structure 120 can extend from one side of the main housing 110 to the other to allow for computing devices of different lengths (e.g., in the Y-direction) to be received by the support structure 120. The multiple contact elements 130 can be provided on the base 160 so that they are exposed to make contact with corresponding contact elements of a computing device when the computing device is placed in the support structure. In one variation, portions of the base 160 and/or the contact elements 130 can both be curved in shape. For example, the base 160 can be flat in the center, and curved at the regions where the base 160 meets the first wall 140 and the second wall 150. The contact elements 130 can be shaped in a similar way.

The charging device 100 can include a power circuit to provide a power signal using at least one of the multiple contact elements 130. For example, the first contact element 130a can correspond to a GND contact element (or negative contact), and the second contact element 130b can correspond to a VBUS contact element (or positive contact). The power circuit can be electrically coupled to the second contact element 130b in order to provide power to a computing device when the corresponding contact elements of the charging device make electrical contact with the multiple contact elements 130. The power circuit can also be electrically coupled to a power port of the charging device 100, such as a port for connecting the charging device 100 to a cable for a wall plug connector, in order to provide the power signal to at least one of the multiple contact elements 130.

The charging device 100 can also include a detect circuit to detect a presence of the computing device using another one of the multiple contact elements 130. In one implementation, the detect circuit can be coupled to the power circuit, or can be at least a part of the power circuit. Referring back to the example above, the first contact element 130a can correspond to a GND contact element, the second contact element 130b can correspond to a VBUS contact element, and the third contact element 130c can correspond to a detect contact element. The detect circuit can signal the power circuit to signal a power signal only when the presence of the computing device is detected by a detect contact element. The detect circuit can also provide safety for a user and the devices by preventing power from being signaled out using a contact element (e.g., contact element 130b) when there is no computing device placed in the support structure 120 to be charged.

Depending on different implementations, the contact elements 130 can be arranged in different configurations. For example, in one variation, the first contact element 130a can correspond to a VBUS contact element, the second contact element 130b can correspond to a GND contact element, and the third contact element 130c can correspond to a detect contact element. In another variations, the first contact element 130a can correspond to a detect contact element, the second contact element 130b can correspond to a VBUS contact element, and the third contact element 130c can correspond to a GND contact element.

Figure 3A:
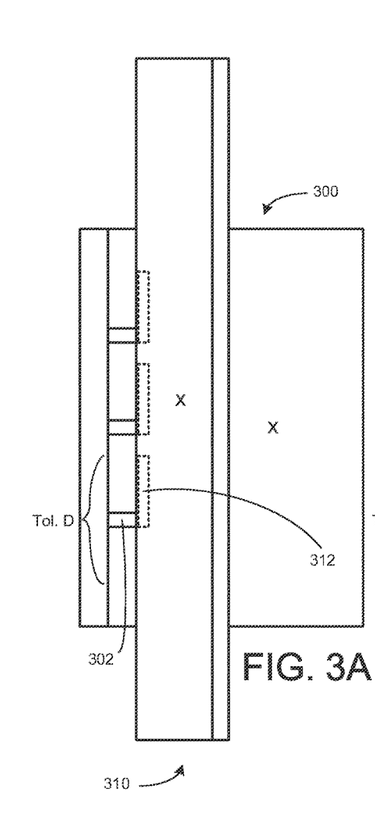
FIGS. 3A-3C illustrate an example charging device and computing device assembly, under an embodiment.
Figure 3B:
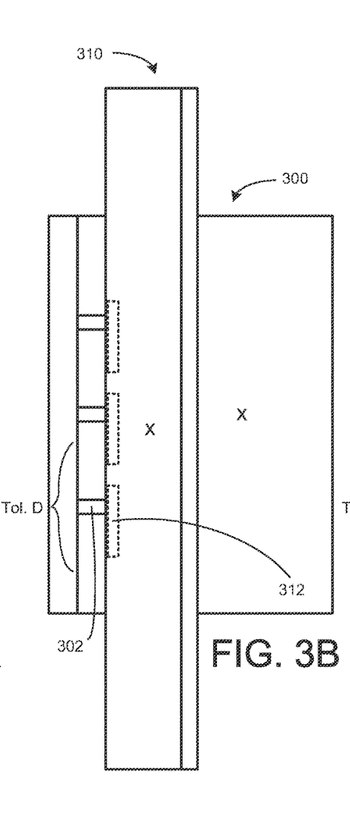
Figure 3C:
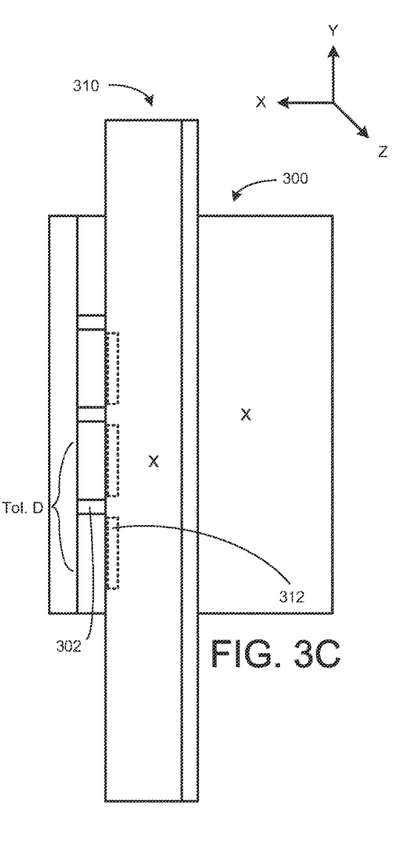

Each of the multiple contact elements 130 can have a respective width (e.g., in the Y-direction), W1, and be spaced apart from an adjacent contact element by a distance, Contact D. The width, W1, provides a sufficient size to enable the contact element 130 to mate with an opposing contact element and to enable transfer of a power signal (or data signal) from one contact element to another. For example, each of the multiple contact elements 130 can have the substantially the same size width. The width, W1, can be, for example, 3 mm, 5 mm, or 6 mm, etc., or any other size depending on different implementations. The multiple contact elements 130 can be positioned along the base 160 of the support structure 120 in order to make electrical contact with a corresponding set of contact elements of the computing device. The multiple contact elements 130 can make electrical contact with the corresponding set of contact elements of the computing device when the computing device is received at multiple points along a distance of the base 160 (e.g., in the Y-direction) of the support structure 120. This allows the multiple contact elements 130 to make and/or maintain electrical contact with the corresponding set of contact elements of the computing device even when the two devices are misaligned (e.g., when the centers of the contact elements are not aligned with each other) (as illustrated in FIGS. 3A-3C).

Figure 2A:
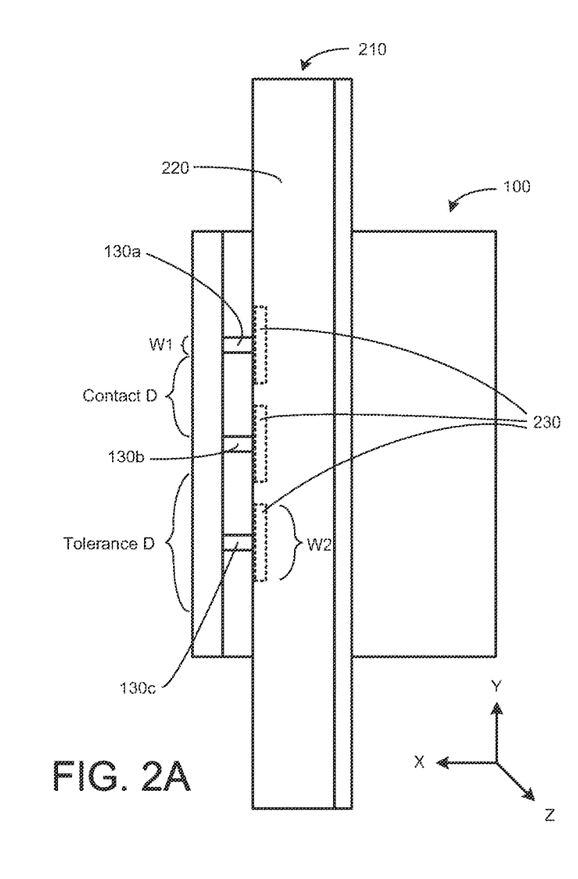
FIGS. 2A-2B illustrate an example charging device and computing device assembly.
Figure 2B:
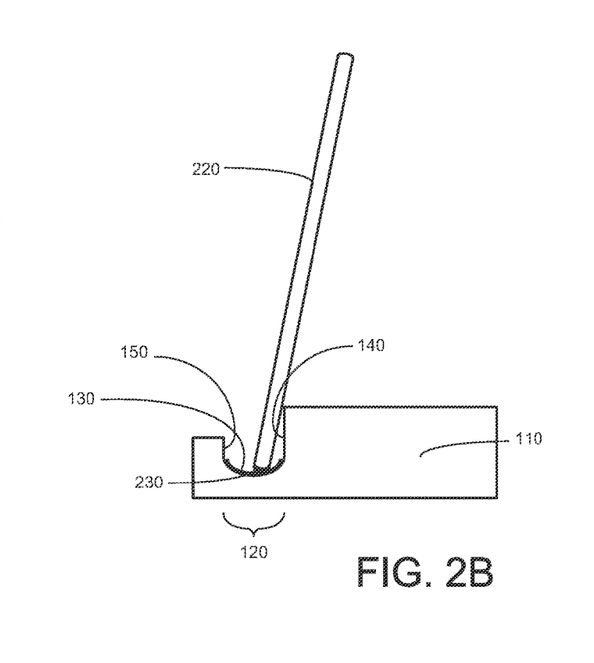

FIGS. 2A-2B illustrate an example charging device and computing device assembly. FIG. 2A illustrates a top view of a charging device 100 with a docked computing device 210 (e.g., looking down in the Z-direction), while FIG. 2B illustrates a side view of the charging device 100 with the docked computing device 210 (e.g., looking in the Y-direction).

The computing device 210 is positioned within the support structure 120 of the charging device 100 so that the contact elements 230 of the computing device 210 make contact with the contact elements 130a, 130b, 130c of the charging device 100. The computing device 210 can be a laptop computer, a tablet device, a smart phone, a keyboard, or a trackpad, for example, that can be recharged by the charging device 100.

In one variation, the contact elements 230 of the computing device 210 can be positioned on a side surface (e.g., a bottom side surface) of the computing device 210. The contact elements 230 of the computing device 210 can make contact with the contact elements 130a, 130b, 130c of the charging device 100 (e.g., the computing device 210 can be docked to receive power), while the computing device 210 is held in at least partially upright position so that the display surface 220 of the computing device 210 can be upright and face, for example, the user. In some implementations, the side surface and the contact elements 230 of the computing device 210 can also have a curved shape to make better contact with the curved shape of the contact elements 130 of the computing device 100.

The support structure 120 can also be dimensioned so that the viewing angle of the computing device 210 in the upright position (in perspective of a user, for example) can be adjusted while the contact elements 230 make and maintain contact with the contact elements 130a, 130b, 130c of the charging device 100. For example, the first wall 140 of the support structure 120 can provide support for holding the computing device 210 in at least the partially upright position. The second wall 150 of the support structure 120 can provide a raised support or edge that the bottom side of the computing device 210 can push up against for preventing the computing device 210 from slipping out of the support structure 120. As an alternative or addition, other retaining features in the support structure 120 can hold the computing device 210 to be in a partially upright orientation (e.g., grooves, retaining mechanisms).

The support structure 120 can be dimensioned to receive different types of computing devices. For example, the support structure 120 can be sized (e.g., in the X-direction) to receive computing devices of different thicknesses. The support structure 120 can also receive computing devices of different widths (e.g., in the Y-direction). Portions of the computing device 210 can be extended out past the sides of the support structure 120 (and/or the main housing 110).

In some variations, the contact elements 230 of the computing device 210 can each have a respective width (e.g., in the Y-direction), W2, that can be larger (e.g., two or three times) than the size of the width, W1, of the contact elements 130. At the same time, the contact elements 130 can be positioned on the base 160 of the support structure 120 to have a distance, Contact D, between adjacent contact elements 130. The distance, Contact D, can be larger in size (e.g., in the Y-direction) than the width, W2, of the contact elements 230 of the computing device 210 so that misplacement of the computing device 210 in the support structure 120 does not cause improper shorting between contacts. For example, a single contact element 230 of the computing device 210 cannot make contact with two contact elements 130 of the charging device 100.

Due to the positions and dimensions of the contact elements 130 of the charging device 100 and the contact elements 230 of the computing device 210, the contact elements 130 can make electrical contact with the corresponding set of contact elements 230 of the computing device when the computing device is received at multiple points along a distance (e.g., Tolerance D) of the base 160 of the support structure 120 (e.g., in the Y-direction). The distance, Tolerance D, is significantly larger than the width, W1, of a contact element 130 of the charging device 100. In one example, the distance, Tolerance D, defines a range along the base 160 of the support structure 120 in which a contact element 230 of the computing device 210 can be positioned in order to make contact with the corresponding contact element 130 of the charging device 100. As a result, the three contact elements 130 of the charging device 100 can make contact with the three corresponding contact elements 230 of the computing device 210 when a contact element 230 is positioned relative to the corresponding contact element 130 at any point along the distance, Tolerance D.

FIGS. 3A-3C illustrate an example charging device and computing device assembly. FIGS. 3A-3C illustrate a top view of a charging device 300 with a docked computing device 310 (e.g., looking down in the Z-direction). In FIGS.

3A-3C, the computing device 310 is docked in different positions relative to the charging device 300, For example, the devices in FIGS. 3A-3C are misaligned from each other (e.g., with respect to the Y-direction, marked by X's), compared to the example illustrated by FIG. 2A (where the devices are substantially aligned with each other so that the centers of each of the contact elements of the charging device are substantially aligned with the centers of each corresponding contact element of the computing device).

In FIG. 3A, the center of the charging device 300 is misaligned from the center of the computing device 310. For example, compared to FIG. 2A where there is substantial alignment, the computing device 310 in FIG. 3A can be misaligned by 10 mm in a first Y-direction. However, although there is misalignment or misplacement of the computing device 310 in the support structure of the charging device 300, the contact elements of the computing device 310 still maintain contact with the contact elements of the charging device 300. The distance, Tolerance D, defines the range along the base of the support structure in which the contact element 312 of the computing device 310 can make contact with the corresponding contact element 302 of the charging device 300.

FIG. 3B also illustrates the computing device 310 that is misaligned from the charging device 300. The misalignment is not as severe as the misalignment illustrated in FIG. 3A or 3B. Again, because the contact element 312 of the computing device 310 is within the distance, Tolerance D, the contact elements of the computing device 310 still maintain contact with the contact elements of the charging device 300.

In FIG. 3C, the computing device 310 is misaligned from the charging device 300 by a large amount (e.g., misaligned by more than 10 mm in a second Y-direction) so that the contact element 312 of the computing device 310 is not within the distance, Tolerance D, of the corresponding contact element of the charging device 300. As a result, the contact elements of the computing device 310 do not make contact with the contact elements of the charging device 300, and the computing device 310 cannot receive a power signal to be recharged. However, at the same time, even though there is significant misalignment, improper shorting and/or improper contact between contact elements are prevented because the width of the contact element 312 is less than the distance between the contact elements of the charging device.

Figure 4:
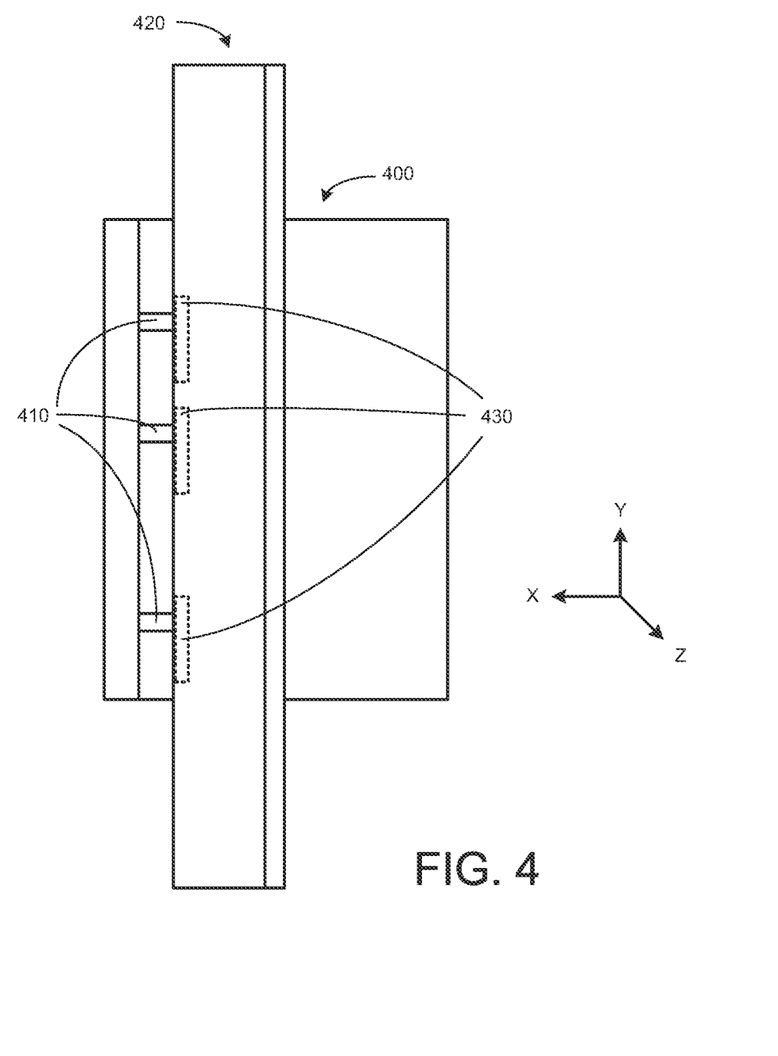
FIG. 4 illustrates an example charging device for a computing device, under another embodiment.

FIG. 4 illustrates an example charging device for a computing device. The charging device 400 in FIG. 4 can include similar features as the charging device described with respect to FIGS. 1A-3C. However, the charging device 400 has three contact elements 410 that are spaced apart from each other at different distances. Regardless of the different spacing sizes, the charging device 400 can provide power to a docked computing device 420 that has three corresponding contact elements 430 when the contact elements 410 make contact with the corresponding contact elements 430 of the computing device 420. Like the charging device described with respect to FIGS. 1A-3C, the contact elements 410 are positioned to make electrical contact with the corresponding set of contact elements 430 when the computing device 410 is received at any point along a distance of the base of the support structure.

ALTERNATIVE EMBODIMENTS

As an alternative or addition, the charging device described in FIGS. 1A-4 can include a data circuit to provide/receive a data signal using a contact element. For example, the charging device can include two additional contact elements (e.g., DATA+, DATA−) for exchanging data between the charging device and the computing device. In variations, the charging device can include one or more communication ports (e.g., a universal standard bus or micro-USB) to couple the charging device to another computing device (e.g., a desktop computer, or another mobile computing device), in this manner, when the computing device is docked to the charging device so that the multiple contact elements of the charging device makes contact with the corresponding set of contact elements of the computing device, data can also be exchanged between the computing device and the coupled second computing device. In one example, the charging device can also include other ports, such as an audio port, for connecting the charging device to an output device, such as speakers.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A system comprising:
a computing device including a first set of contact elements;
a charging device including a support structure and a second set of contact elements provided in the support structure;
wherein the computing device is shaped to be received in the support structure of the charging device to mate the first set of contact elements with the second set of contact elements; and
wherein each respective contact element of the first set of contact elements of the computing device comprises a receiving width that is greater than a relative width of a corresponding contact element of the second set of contact elements of the charging device, enabling the respective contact element of the first set of contact elements to make electrical contact with the corresponding contact element of the second set of contact elements across a tolerance width that is greater than the receiving width of the respective contact element of the computing device.

2. The system of claim 1, wherein the first set of contact elements and the second set of contact elements are positioned to make electrical contact when the computing device and the charging device are misaligned as defined by the tolerance width.

3. The system of claim 1, wherein the support structure is dimensioned to enable the computing device to be held in an upright position.

4. The system of claim 1, wherein the charging device includes a power circuit to provide a power signal using a power contact element of the second set of contact elements.

5. The system of claim 4, wherein the charging device includes a detect circuit to detect a presence of the computing device using detect contact element of the second set of contact elements.

6. The system of claim 5, wherein the second set of contact elements further includes a data contact element, and wherein the power contact element is positioned adjacent to the detect contact element, and wherein the data contact element is positioned adjacent to the power contact element.

7. The system of claim 6, wherein each of the power, detect, and data contact elements are dimensioned to have the relative width.

8. The system of claim 1, wherein the computing device comprises at least one of a tablet computing device, a laptop computer, or a keyboard.

9. The system of claim 1, wherein the tolerance width prevents more than one contact element of the second set of contact elements to mate with a single one of the first contact elements.

10. A charging device comprising:
   a support structure to support a computing device having a first set of contact elements; and
   a second set of contact elements provided in the support structure;
   wherein the computing device is shaped to be received in the support structure of the charging device to mate the first set of contact elements with the second set of contact elements; and
   wherein each respective contact element of the first set of contact elements of the computing device comprises a receiving width that is greater than a relative width of a corresponding contact element of the second set of contact elements of the charging device, enabling the respective contact element of the first set of contact elements to make electrical contact with the corresponding contact element of the second set of contact elements across a tolerance width that is greater that the receiving width of the respective contact element of the computing device.

11. The charging device of claim 10, wherein the computing device comprises at least one of a tablet computing device, a laptop computer, or a keyboard.

12. The charging device of claim 10, wherein the support structure is dimensioned to enable the computing device to be held in an upright position.

13. The charging device of claim 10, further comprising:
   a power circuit to provide a power signal using at least one power contact element of the second set of contact elements.

14. The charging device of claim 13, further comprising:
   a detect circuit to detect a presence of the computing device using a detect contact element of the second set of contact elements.

15. The charging device of claim 14,
   wherein the second set of contact elements includes a data contact element to transmit and receive data, and wherein the power contact element is positioned adjacent to the detect contact element, and wherein the data contact element is positioned adjacent to the power contact element.

16. The charging device of claim 15, wherein each of the power, detect, and data contact elements are dimensioned to have the relative width.

17. The charging device of claim 10, wherein the tolerance width prevents more than one contact element of the second set of contact elements to mate with a single one of the first contact elements.

* * * * *

UNITED STATES PATENT AND TRADEMARK OFFICE
CERTIFICATE OF CORRECTION

PATENT NO. : 10,270,267 B2
APPLICATION NO. : 14/394496
DATED : April 23, 2019
INVENTOR(S) : Giovanni Mata Magana et al.

Page 1 of 1

It is certified that error appears in the above-identified patent and that said Letters Patent is hereby corrected as shown below:

In the Claims

In Column 8, Line 4, Claim 10, delete the second instance of "that" and insert -- than --, therefor.

Signed and Sealed this
Tenth Day of December, 2019

Andrei Iancu
*Director of the United States Patent and Trademark Office*